Nov. 12, 1940.  M. SCHNEIDER  2,221,330
ALARM DEVICE FOR AUTOMOBILES
Filed Aug. 1, 1938
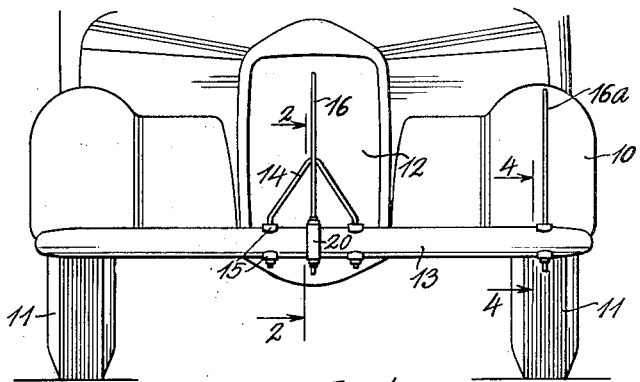
Fig.1.
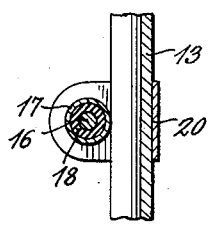
Fig.3.
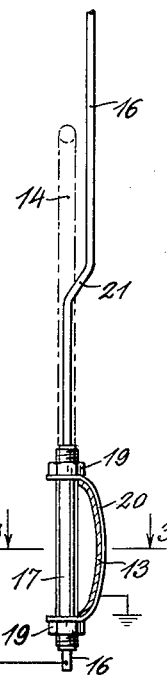
Fig.2.
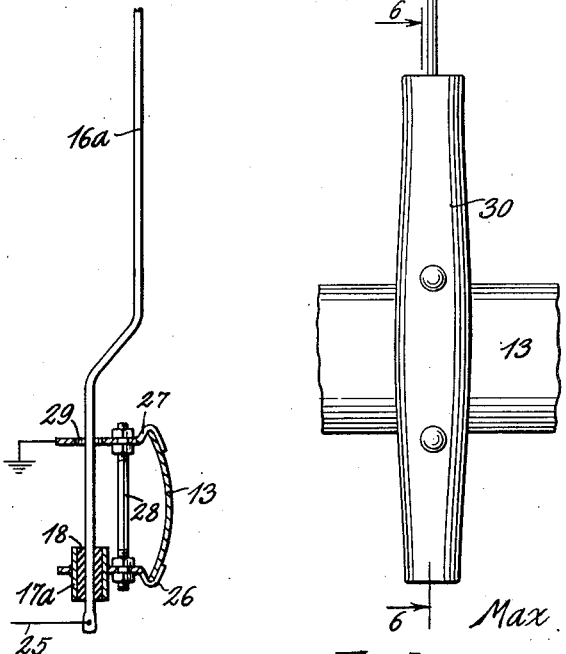
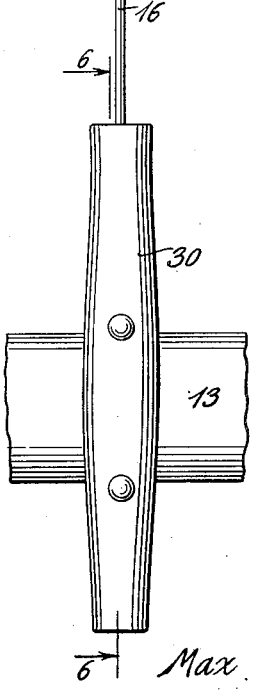
Fig.5.
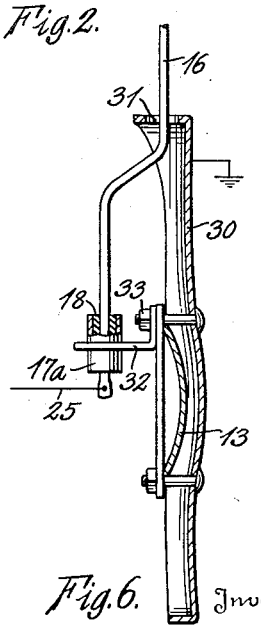
Fig.6.
Inventor
Max Schneider.
By Martin E. Anderson
Attorney Patented Nov. 12, 1940

2,221,330

UNITED STATES PATENT OFFICE 2,221,330

ALARM DEVICE FOR AUTOMOBILES

Max Schneider, Denver, Colo.

Application August 1, 1938, Serial No. 222,359

1 Claim. (Cl. 200—52)

This invention relates to improvements in devices for protecting automotive vehicles from injury from other automobiles, more especially during parallel parking, and has reference more particularly to an electric switch for use in an audible signal circuit.

The present automobile design employs an ornamental grill in front of the radiator and since this terminates only a short distance to the rear of the front bumper it is frequently crushed or badly bent when the bumper of another car passes over the front bumper, as it often does in parking.

To prevent injury to radiator grills from this cause it is customary to attach long cross bars to the front bumpers and these extend upwardly to such a height that they will engage the bumper of another car. Such protector bars are a great help but in spite of them radiator grills are often badly injured. The ordinary protector bars are fastened to the bumpers and these will twist when subjected to a sufficient torsional force and frequently the bars bend or are disconnected from the bumpers by the force to which they are subjected. Besides this source of injury the grills are frequently injured by trucks whose bodies are higher than the bars.

It is well understood that such injuries are not caused by deliberate action but are due in greater part to carelessness and accident and if the driver who is parking his car or removing it from the parking place were apprised by the sounding of a signal that his car was approaching a position in which he was liable to injure the other car, he would stop. For example: If a driver is seated in his car and some one is attempting to park in the space directly in front and if he sounds his horn when the car approaches his dangerously close the other party will immediately stop.

It is the object of this invention to produce a switch that can be applied to the front bumper and which shall have one member extending vertically so that it will be engaged by any solid member that is about to pass over the bumper and can be moved rearwardly so as to engage a stationary switch contact and close a circuit to a horn or other audible signal.

Another object is to produce a switch that is so positioned with respect to the bumper of an automobile that it will be operated only by a solid member that is positioned at such a height that it will pass over the bumper.

It is a further object to produce a circuit-closing device, for closing the signal circuit of an automobile, that will also serve as guide-post and a fender protector.

Another object is to produce a circuit-closing device that can be quickly and easily applied to any bumper and readily connected in the signal circuit.

The above and other objects that may become apparent as the description proceeds are attained by means of a construction and an arrangement of parts that will now be described in detail, and reference for this purpose will be had to the accompanying drawing in which the invention is illustrated and in which Figure 1 is a front view of an automobile showing the same equipped with my improved alarm device;

Figure 2 is a section taken on line 2—2 Fig. 1;

Figure 3 is a section taken on line 3—3 Fig. 2;

Figure 4 is a section taken on line 4—4 Fig. 1 and shows a slightly modified form of the invention;

Figure 5 is a front view of another modified embodiment, and

Figure 6 is a section taken on line 6—6 Fig. 5.

In the drawing reference number 10 designates the body and the frame of an automobile, and 11 the wheels, while 12 designates the radiator grill. The body or frame carries a front bumper 13 of usual construction.

It is customary to attach cross bars of various shapes and sizes to the bumper to protect the radiator grill and sometimes to protect the fenders. In the drawing reference numeral 14 designates a popular type of radiator grill protector, comprising a steel bar bent into a V shape and attached to the bumper by suitable means such as clips 15.

In the embodiment of the invention illustrated in Figs. 1, 2 and 3 the V-shaped bar 14 serves as one contact of a switch or circuit closer whose construction will now be described.

Referring now more particularly to Figs. 2 and 3, it will be seen that a resilient metal rod 16 is attached to the bumper and projects upwardly therefrom to any extent desired, preferably to the top of the radiator grill. The lower end of switch contact 16 extends through a metal pipe 17 and is electrically insulated from it by means of a rubber covering 18. The ends of pipe 17 are threaded and provided with nuts 19. A strap 20 is provided at both ends with openings through which the ends of pipe 17 extend and passes around the front of the bumper. When nuts 19 are tightened the elongated switch contact is secured to the bumper in the manner shown in Figs. 2 and 3. The contact 16 is offset as indicated at 21 in Fig. 2 so as to pass upwardly in front of the switch contact 14 and the parts are so adjusted that contact 16 is normally spaced from contact 14 and will be moved into engagement by a force of sufficient value to bend it rearwardly.

In Fig. 2, reference numeral 22 designates the battery and 23 the electric horn with which all cars are provided. One pole of the battery is grounded to the frame at 24 and the horn is connected in series with a circuit 25 that extends to and is connected with the elongated contact 16. Since the bumper is in electrical contact with the frame it is, of course, in electrical contact with the grounded pole of the battery. Whenever contact 16 is moved rearwardly into electrical engagement with contact 14 a circuit will be completed through the horn and the latter will be sounded.

In Fig. 4 a slightly modified form of the invention is shown. In this embodiment the lower end of contact 16a passes through a short pipe 17a and is insulated therefrom by a layer of rubber 18. Pipe 17a passes through an opening in clip 26, which is positioned to engage the lower edge of the bumper 13. Another clip, 27 engages the upper edge of the bumper and the two clips are connected by a bolt 28. Clip 27 has a hole 29 that is larger than rod 16a and the latter passes through this hole and is preferably positioned centrally thereof. Since the clip 27 is grounded and since rod 16a forms a continuation of wire 25 it is evident that the circuit will be closed through the horn whenever the rod is bent sufficiently to come into electrical contact with the wall of hole 29. A circuit closer like the one just described, does not require a bar corresponding to 14 and can be attached to any fender at any place along its length. In Fig. 1 the circuit closer just described, is shown as attached directly in front of a fender and serves to sound a warning signal before the fender is injured.

It frequently happens that an automobile is provided with one or more cross bars like that shown in Figs. 5 and 6 and indicated by numeral 30. Where such cross bars are in place they may be used as the stationary contact. The upper end is first provided with a hole 31 through which the resilient elongated contact 16 extends. The pipe 17a is secured to one end of an angle bracket 32 that is secured in place by a bolt 33. Whenever contact 16 is moved into engagement with the wall of opening 31, the circuit through the horn will be closed and a warning signal sounded.

It is evident that the circuit closer or switch may be embodied in a variety of specifically different forms and those described are for the purpose of illustration only. The underlying idea is to provide a normally open circuit closer having one contact long and resilient. It is, of course, possible to substitute for the long resilient rod 16 a rod that is hinged at its lower end and held in a predetermined position by means of a spring, but since this would function in substantially the same way it has not been illustrated.

When used for the purpose indicated, the contact 16 extends upwardly but there are cases where it can project downwardly, as when it is attached to the rear end of a truck.

When the circuit closer is attached to the bumper near its outer end it can serve as a guide.

When an automobile is equipped with a circuit closer like that shown on the drawing and described herein a signal alarm will be sounded whenever any solid member approaches the radiator grill or the fender and if some one is parking or removing his car from a parking place and hears the alarm he will immediately stop his car or move it in the other direction.

The contact 16 is preferably made of resilient material so that it will resume its normal shape after it has been bent.

It will be observed from the drawing that the flexible switch member 16, 16a is so positioned with respect to the bumper 13 that the bumper of another car may engage the bumper 13 or the cross bar 30 without closing the signal switch; this is an important consideration because it frequently happens that the bumpers of adjacent automobiles engage each other during the operation of parking or removing one of them from a parking place. So long as the bumpers engage each other, no harm will result. If the bumper of one automobile tries to pass over the bumper of another, it will engage the flexible switch member and operate a warning signal.

Having described the invention what is claimed is:

A switch for use in a warning signal system for automobiles having bumpers which form a support therefor, comprising, in combination, a rod-like switch member attached to the bumper and positioned between the bumper and the automobile in such a way as to be shielded by the bumper, said switch member extending above the bumper into position to be engaged and moved towards the automobile by a solid member approaching to within a predetermined distance of the latter, and a second switch member positioned between the first switch member and the automobile, the two switch members being electrically insulated from each other and normally out of contact but movable into contact when pressure is applied to the rod-like switch member by a solid member of another vehicle in its movement towards the automobile.

MAX SCHNEIDER.